United States Patent [19]

Aylor

[11] Patent Number: 4,781,523
[45] Date of Patent: Nov. 1, 1988

[54] FLUID ENERGY TURBINE

[76] Inventor: Elmo E. Aylor, 498 Hwy. 208, Yerington, Nev. 89447

[21] Appl. No.: 56,120

[22] Filed: Jun. 1, 1987

[51] Int. Cl.⁴ .............................................. F03D 1/06
[52] U.S. Cl. ..................................... 415/2 A; 415/4; 415/215; 416/186 R
[58] Field of Search ............... 416/188, 189 A, 186 A, 416/187, 186 R; 415/2 A, 3 A, 215, 4 A

[56] References Cited

U.S. PATENT DOCUMENTS

| | | | |
|---|---|---|---|
| 1,050,350 | 1/1913 | Davis | 415/2 A X |
| 1,433,995 | 10/1922 | Fowle | 415/2 A X |
| 1,578,923 | 3/1926 | Schlotter | 415/2 A X |
| 2,017,961 | 10/1935 | Ferral | 415/2 A |
| 2,123,657 | 7/1938 | Munk | 416/189 A X |
| 2,434,896 | 1/1948 | Ayers | 416/188 X |
| 3,209,156 | 9/1965 | Struble | 416/189 A X |
| 4,147,472 | 4/1979 | Kling | 416/189 A X |
| 4,320,304 | 3/1982 | Karlsson et al. | 415/3 A X |
| 4,415,306 | 11/1983 | Cobden | 416/189 A X |
| 4,684,316 | 8/1987 | Karlsson | 415/2 A |

FOREIGN PATENT DOCUMENTS

| | | | |
|---|---|---|---|
| 145276 | 9/1950 | Australia | 416/189 A |
| 804090 | 4/1951 | Fed. Rep. of Germany | 416/189 A |
| 663394 | 8/1929 | France | 416/188 |
| 864471 | 4/1941 | France | 416/188 |
| 975625 | 3/1951 | France | 415/2 A |
| 2507252 | 12/1982 | France | 415/2 A |

Primary Examiner—Everette A. Powell, Jr.
Attorney, Agent, or Firm—Charles F. Schroeder

[57] ABSTRACT

A fluid energy converter having a squirrel-cage-like rotor in which blades peripherally distributed about a horizontal axis of rotation are in a plane generally parallel to the axis of rotation. An entry at one end of the rotor is arranged to face the oncoming fluid for receipt thereof. A contoured deflector on the interior of the rotor forms an annular path or duct for redirecting the predominantly axial flow of fluid from the entry outwardly to the peripherally distributed blades and through the slots therebetween. The total area of the slots exists through which the fluid passes is preferably made less than either the entry area or the cross-sectional area of the duct leading to the blades such that the blades act as a constriction in the fluid passageway, somewhat as a venturi restriction in the flow path. The high efficiencies obtained in operating the converter are believed due to a jet action of the air released from the venturi slots between blades in addition to the force of reduced pressure produced on each blade to rotate the rotor. A ring about the entry is aerodynamically shaped to cause fluid passing over the entry to direct the fluid exiting from the blades so that it follows a greater diameter aerodynamic aft fairing structure of slightly greater diameter than the entry ring to promote greater efficiency of operation of the unit. Both air and liquid driven blading arrangements are disclosed. A second embodiment of the invention incorporates blades angled upwardly from the axis of rotation but with a directional component predominantly parallel to the axis.

18 Claims, 2 Drawing Sheets

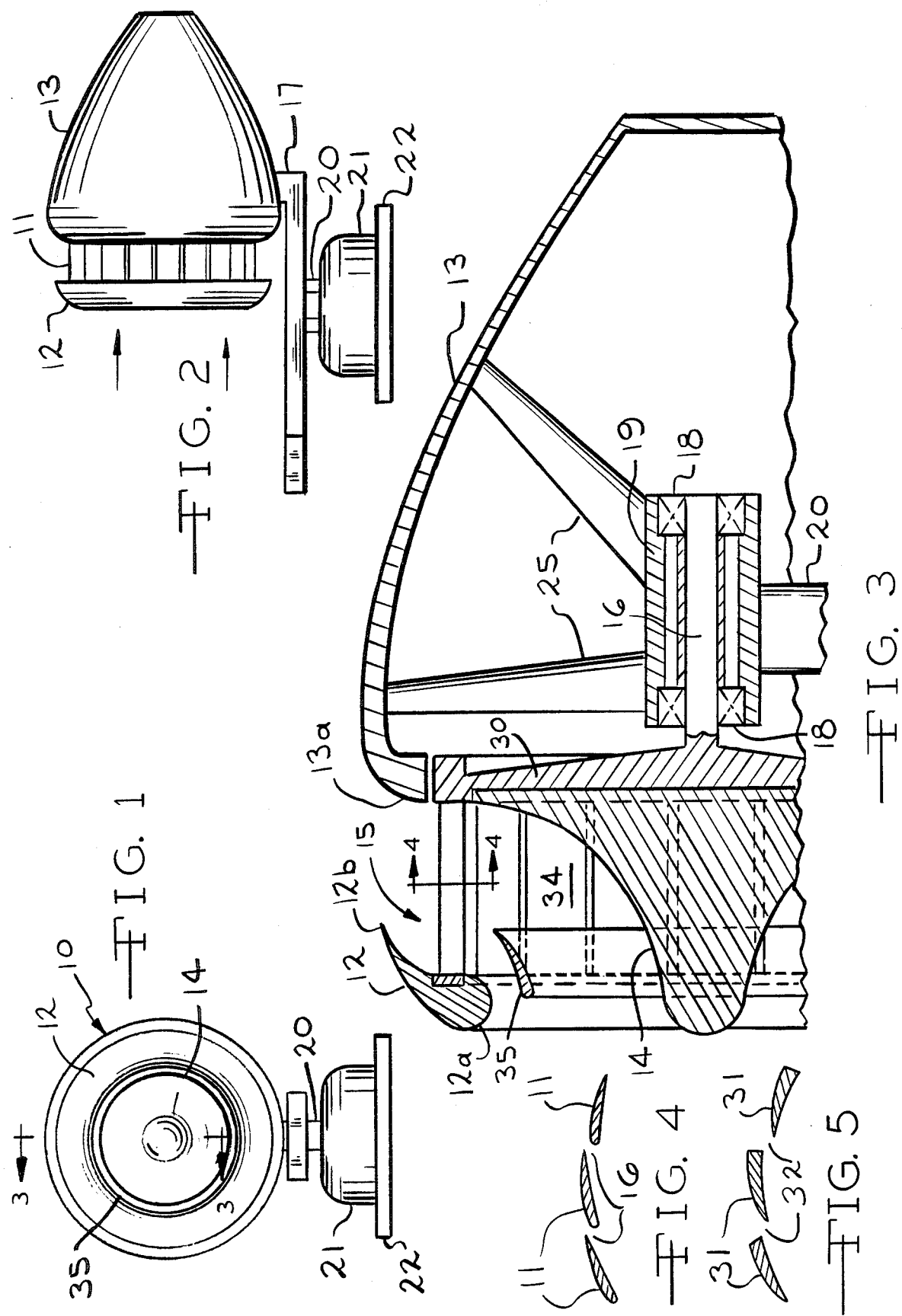

FLUID ENERGY TURBINE

BACKGROUND OF THE INVENTION

The present invention is a turbine-type fluid energy converter and more particularly a wind driven energy converter having a frontal air inlet and a circumferential air outlet.

For centuries man has attempted to increase the efficiency of fluid energy converting machines to permit their use as a prime energy source. The power output of units thus far evolved, however, has been overshadowed by the greater efficiency and low cost of mass production of energy from abundantly available concentrated fuel, such as nuclear fuels, or fossil fuels such as oil and coal except, in remote regions where the output from mass production energy units is not readily available. Although wind power has in recent years become more popularly available in the U.S., such as from wind farms, the economics of conversion of such fluid energy to useful power falters when subjected to strict analysis without the benefit of tax subsidies and other legislated regulatory advantages.

PRIOR ART

Windmills of the prior art, in general, have been of two types, namely, the radially extending propeller or multiblade windmills which have a horizontal axis of rotation and windmills which have a vertical axis of rotation with vertically oriented blades circumferentially spaced about the axis. Hybrid windmills also exist such as the Darrieus rotor windmill which has a vertical axis and blades having both vertical and horizontal directional vectors in a form similar to bowed egg beater type blades extending from spaced points along the axis of rotation.

It is an object of the present invention to provide a fluid energy turbine device capable of efficiency of conversion of fluid energy to useful purposes which surpasses the efficiencies of fluid power generation by other known devices.

BRIEF DESCRIPTION OF THE INVENTION

The present invention is a novel fluid energy converter in which a rotor incorporates a series of longitudinal blades generally in a plane extending circumferentially about and parallel to the axis of rotation forming, in a sense, a squirrel-cage-like turbine rotor.

A central fluid inlet to the unit accepts oncoming fluid into a reservoir region or a duct which redirects it from a generally horizontal or axial directional flow to flow in outward directions away from the axis of rotation toward the circumferentially distributed blades where it is then released in cross flow relation through slots between the blades. When the blades are closely spaced, such that the total exit area from the slots between blades is less than the cross-sectional area of the entry or the passage leading to the blades, the slot exits act together to function somewhat as a restriction zone of a venturi passage. An aft fairing structure is arranged to receive the blade emitted air in smooth flow relation over the unit. The invention also embodies a rotor with blades angled slightly upward to the axis of rotation which function with an entry reservoir or duct to, in a sense, scoop in and redirect oncoming air through the slots between blades.

In the case of conversion of power of incompressible fluids such as water, the blades incorporated in the rotor are in general thin at their leading edge and thick at their trailing edge whereas for compressible fluids such as air, the blades are usually most effective when aerodynamically shaped with a thicker leading edge.

Features of the invention are compactness of the unit for a given power output in addition to its physical stability and adaptability to a wide range of use where prior wind or other fluid driven units have not been able to fulfill power needs.

Still another feature of the invention is its adaptability to incorporation of augmenting components designed to improve operation and efficiency. It has been found in wind tunnel tests that because of its efficiency of operation such a rotor arrangement can provide considerable power output from a given wind energy input.

Other objects and features which are believed to be characteristic of my invention are set forth with particularity in the appended claims. My invention, however, both in organization and manner of construction, together with further objects and features thereof may be best understood with reference to the following description taken in connection with the accompanying drawings.

THE DRAWINGS

FIG. 1 is a frontal elevational view of a wind turbine device of the present invention;

FIG. 2 is a side elevational view of the wind turbine of FIG. 1;

FIG. 3 is an enlarged side elevation view of a portion of the wind turbine device of FIG. 1 as taken on line 3—3;

FIG. 4 is a cross-sectional view of three of the distributed blades of the turbine device of FIG. 3 as taken on line 4—4; and FIG. 5 is a cross-sectional view of three blades of a water driven turbines of the invention showing the shape and orientation for counterclockwise rotation;

DESCRIPTION

Figure 6:
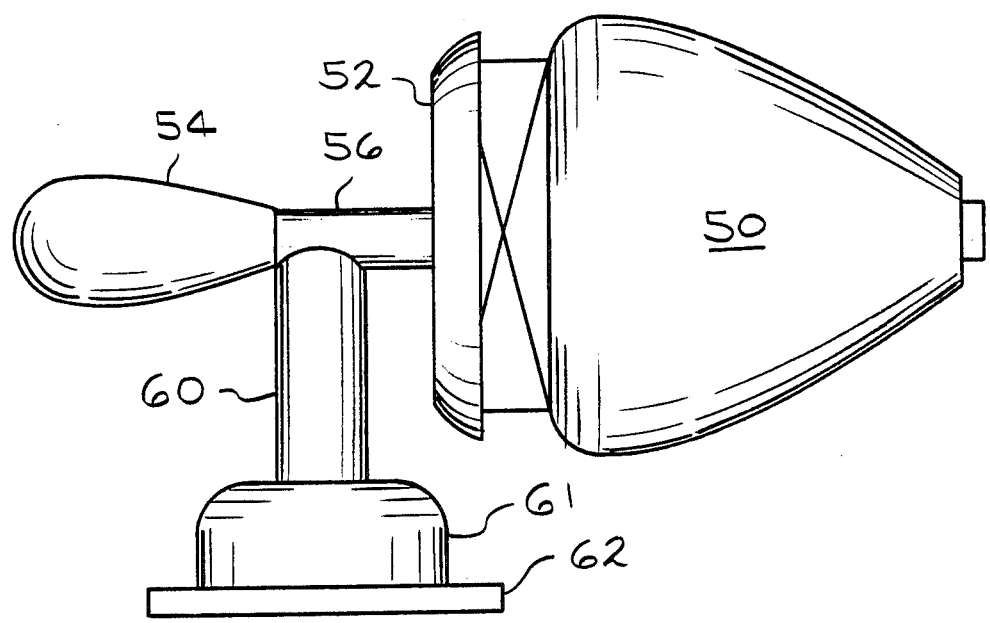
FIG. 6 is a side elevational view of another arrangement for mounting the turbine unit of the invention in pivoted relation on a beam extending to the center of the turbine air entry.

Turning to the drawings in greater detail, FIG. 1 is a front elevational view of a turbine unit 10 which exemplifies the invention illustrating the front entry end of a wind turbine surrounded by an air inlet or entry ring 12 and having a central outward projecting inlet flow guide 14. The inlet ring 12, in the embodiment illustrated, forms the front edge of the rotor and is supported at the front or air entry ends of a plurality of circumferentially distributed air engaged blades 11 which in turn are supported in cantilever fashion at their opposite or back ends by a rotor hub 30. The blades are held at one end by the hub 30 parallel to each other in a circular plane parallel to and concentric with the axis of rotation of the rotor.

The hub 30 and blade assembly has a rotary support axle 16 mounted in bearings 18 as shown in FIG. 3. Power takeoff can be accomplished conventionally by gears or belts not shown. Alternately, the rotor can be connected directly to a load such as a transmission or generator shaft or to a fluid compressor unit. The bearings 18 are set in a bearing housing 19 mounted at the top of a vertically extending support column 17. The bearing housing 19 also provides a base for a series of support arms 25 for a stationary aerodynamically shaped aft fairing shell or hood 13.

The support column 17 as shown in FIG. 2 extends upwardly from a horizontal yaw beam 26 which in turn is rotatably supported generally at its longitudinal center on a pivot pylon 20 which extends upwardly from a bearing housing 21 supported on a mounting flange 22. The yaw beam 26 extends horizontally in opposite directions from the pivot pylon to the support column 10 at one end and a counterweight 24 at the opposite end of adequate weight to balance the rotatable turbine-supporting assembly on the pylon.

The distribution and orientation of the turbine blades 11 is shown in FIG. 4. The rotor is designed to incorporate a number of blades which may be flat and of constant thickness but which in profile are preferably aerodynamically shaped and pitched to convert the largest amount of energy possible from the prevailing winds or other air flow. Each of such blades representative of use in the invention, in profile has a more curved upper surface than its under surface and is provided with a thick leading edge and a thin trailing edge. The cumulative exit area of the slots between the blades 11 is preferably made to be less in total area than the cross-sectional area of the entry passage leading to the blade region including the area bounded by the air inlet ring 12, thus causing the blade region to offer a restriction zone to the passage of air through the rotor.

The exit from the slots 16 between blades 11 thus in effect can be considered as acting somewhat as a long venturi-like throat formed between the underside of the tail edge of each blade and the upper leading surface of its adjacent following blade. They are preferably not overlapped. The slot between each adjacent pair terminates at the throat of the venturi-like path therethrough, resulting in a high velocity ejection of air from the constricting slot.

FIG. 5 illustrates a corresponding arrangement of blades 31 for a water driven turbine in which each blade has a thin leading edge and a thick trailing edge causing counter-clockwise rotation upon passage of water through the in between slots 32.

In the arrangement of FIG. 3, the velocity of fluid through the restriction between blades increases at a low static pressure from the lesser velocity of fluid on the rotor interior having a higher static pressure. The net result is a strong differential in pressure between the inside and outside of the squirrel-cage-like rotor 15, thus causing an acceleration of flow through each of the rotor slots 16. The high velocity of the air exiting from the slots is believed to function as a jet reaction, contributing to the total torque of the rotor.

In some instances wind conditions and power requirements can dictate design of the rotor with longer blades and closer spacing, resulting in generally the same total constriction area as with shorter blades. Although the blades are herein described preferably with an aerodynamic wing-type tab, the turbine can also function, although less efficiently with flat uniformly thick blades, or uniformly thick blades curved to provide a camber. The blades in being located a radial distance from the hub center can be provided a weight such that together they act as a concentrated mass which will cause the rotor to act somewhat like a flywheel. A separate weight can also be added to the rotor assembly such as in the form of an added ring, to provide the desired flywheel operational characteristics. The flywheel effect, beside resulting in storage of energy in the rotor, also assists in damping quick variations in air flow tending to suddenly increase or decrease the rotational speed. In other words, the rotor structure lends itself to maintaining a more constant speed of rotation with a resulting more constant power output regardless of possible quick velocity changes.

In the embodiment illustrated in FIGS. 1 to 4, the trailing edge of each blade 11 is arranged to have a slightly radially outward position relative to the leading edge of a following blade to establish the desired pitch angle. Thus upon air passing between a leading edge and a preceding trailing edge, and due to the venturi restriction, it causes an increase in flow velocity which produces a reduced static pressure over the curved upper surface of the blade. The interaction of the low pressure over the curved top of the blade and high static pressure inside the squirrel-cage-like rotor cause a strong lift reaction on the wing-shaped blades. The pitch angle is made such that this lift vector force is tipped at an angle to a line tangent to the arc of rotation. The pitch angle is defined as the angle of the blade chord line to a line tangent to the arc of rotation which in turn is normal to the radius or the arc. The tangential vector of the lift surface becomes the rotational driving force or torque to cause rotation of the rotor in a counter-clockwise direction in the illustrated arrangement. It has been found that an 11° angle of the blades to their cord provides a high degree of efficiency. The total area of the slot outlets is less than the inlet area to the rotor thereby promoting establishment of a back pressure which in turn acts to form jets of air emitted from the slot openings.

In multiple radial bladed farm windmills, the solid frontal area, or high solidity ratio, is the key to providing high torque. By the same token such large blade solidity in such windmills imparts a bending force on the support tower or other support structure. In the present invention, even with the high solidity ratio of closely spaced blades, the radial component of lift on a blade is equal and opposite to the lift of the diametrically opposed blades and therefore the support for the turbine unit, such as a support tower, is not subject to bending forces of the flowing air acting directly on the blades. This feature lends itself to using the turbine unit on a vehicle to generate power with a minimum of drag, even to the extent of making it possible to provide forward propulsion power for the vehicle against the wind.

FIG. 3 also illustrates how the inlet ring 12 leading to the interior of the rotor 15, in cross-section, can be aerodynamically shaped somewhat like a "comma" with a rounded radial inner edge 12a on one side of a flow dividing line and a thin trailing edge 12b on the other side overhanging a portion of each of the blades 11 and the slots 16 in between. The radially inward side of the edge 12a is complementarily shaped to cooperate with a larger diameter rounded leading edge 13a of the fairing shell 13 to provide a flow guide for air exiting from the multiple venturi slots 16 between the blades. In this regard, the diameter of the trailing guide edge 12b which is larger in diameter than the blade region is made to be slightly smaller than the diameter of the shell 13 following its leading edge 13a.

The fluid or air passing over rather than through the entry ring 12, from the flow dividing line of its leading edge at or near a circular line of tangency of a plane normal to the axis of rotation, thus is forced to accelerate beyond the ambient air velocity by reason it having a larger diameter to pass around. The comma shaped cross-section of the inlet or air entry ring 12 causes the ring to act very similar to a leading edge-extended slat on modern high performance aircraft. Due to the physical laws of inertia and fluid viscosity, the increased velocity over the entry ring 12 is extended over the gap between its trailing edge 12b and the rounded edge 13a of the slightly larger diameter of the fairing shell 13. A reduced pressure is thereby also established over the blades. The distance or gap over which the air flows from the entry ring 12 to the fairing 13 is reduced by the portion 12b of the entry ring overhanging the blades 15.

The air passing over the trailing edge 12b of the inlet ring therefore acts to exert a force on the outward exiting air from the blades 11 to guide its flow closely over the rounded edge 13a of the fairing shell 13 and the shell itself. The air released from the blade region is thereby caused to ride over the curvalinear aerodynamically shaped aft portions of the shell 13 which diminish in diameter over a length approximating the diameter of the rotor. The aft fairing might be eliminated but efficiency is thereby sacrificed because the resulting flow path would be less effective in helping to establish an annular low pressure region about the blades. The air flowing from the blade region, in other words, it confined by the dimensional aspects and contouring of the trailing edge 12b of the entry ring as well as by the air flow over the inlet ring to the fairing.

The turbine unit 10 in being mounted on the trailing end of the rotatable counterweighted yaw beam 26, moves as a weather vane, responsive to the direction of air flow to orient the entry ring 12 for receipt of oncoming air. Since air flowing through and over the turbine produces a drag force on the pivoted beam 26, the turbine is caused to face the oncoming wind without need for the conventional slab tail vane of radial bladed farm windmills. Air it is found need not always approach the inlet ring straight on into the rotor axis but can approach the inlet at as much as 45° from either side of the rotor axis and operate well. This means that quick changes of air flow direction within a 90° sector will have little effect on performance.

Air entering the inlet ring 12 is caused to be redirected outwardly in all directions by the circular, windward projecting, generally conical flow guide 14 which as shown in cross-section in FIG. 3 has a profile contoured to form an annular duct to convert the axial flow of air through the air entry ring 12 to outward flow in a radial direction. The guide 14, in other words, is contoured in cooperation with the rounded inner edge 12a of the entry ring 12 to shape the annular air duct through the turbine for release of the entry air in cross-flow relation through the slots 16 between the blades 11 which in the arrangement illustrated in FIGS. 3 and 4 causes rotation of the rotor in counter-clockwise direction.

The inlet area bounded by the inlet ring 12 can be arranged to retain a gridwork (not shown) so that air flow into the region of the duct 34 will be assured of being more smooth and uniform with diminished tendencies toward turbulence. Additionally the grid can provide increased strength for the rotor. A secondary air flow ring or air baffle 35 alternately or in addition might be provided as illustrated in FIG. 3 wherein the baffle is shown concentric with and about the air guide 14. It can be supported by low air resistant struts (not shown) extending from the inlet ring 12 and can be constructed to be complementary with the region of the air guide 14 about which it extends. In this regard it can be provided a curved flared shape to conform complementarily with the contour of the annular duct 34 to promote a fuller distribution of the flowing air over the length of the blades upon passage through the slots 16.

Another feature of the invention is that the inlet ring can provide structural integrity for the rotor. In this regard, the inlet ring 12 need not be provided the shape of an aerodynamic baffle. If desired a separate stationary aerodynamic baffle might be provided as a lead-in over a flat blade-retaining inlet ring for the rotor.

The design criteria for contouring the air redirectioning guide 14 is quite flexible in that it can be made short in depth or extended axially outward from the rotor depending upon what prevailing operating conditions indicate to be most advantageous. Further, the air guide 14 might be separable and moveable axially outward or inward from and to the hub 30 for control or regulation of air flow through the blades such as for throttling of airflow during a storm. Movement in and out can be effected automatically by a centrifugal speed regulator housed within the fairing housing structure 13. As an alternate, the air guide might be omitted in which case the interior of the rotor 15 becomes an air chamber pressurized by incoming air to force release of the contained air through the blades 11 which depending upon condition of operation, can be designed with spacing providing a constricted flow path.

Efficiencies of operation of the unit have reached much higher than expected levels compared to prior art wind units. By way of example, wind tunnel tests of an actual test model of the illustrated invention produced an output of approximately 0.5 KW and realized conversion efficiencies of approximately 70% in comparison to a high of 59.3% for propeller-type windmills which in practice is not attained. Such windmills are considered excellent at 35% to 40% efficiency. The wind tunnel tested model had a diameter of 13 inches and a total area defined at the flow dividing line of the inlet ring 12 of approximately 144 square inches. Twenty blades were supported in the rotor, each having a chord of 1⅝" and a span of 4" pitched at 11° to the tangent of the arc of rotation. The slots between the blades had an area of 41% of total and a ratio of solidity in the range of 90% in comparison to a ratio of 5 to 10% solidity for 2 or 3 propeller blade windmills.

Figure 7:
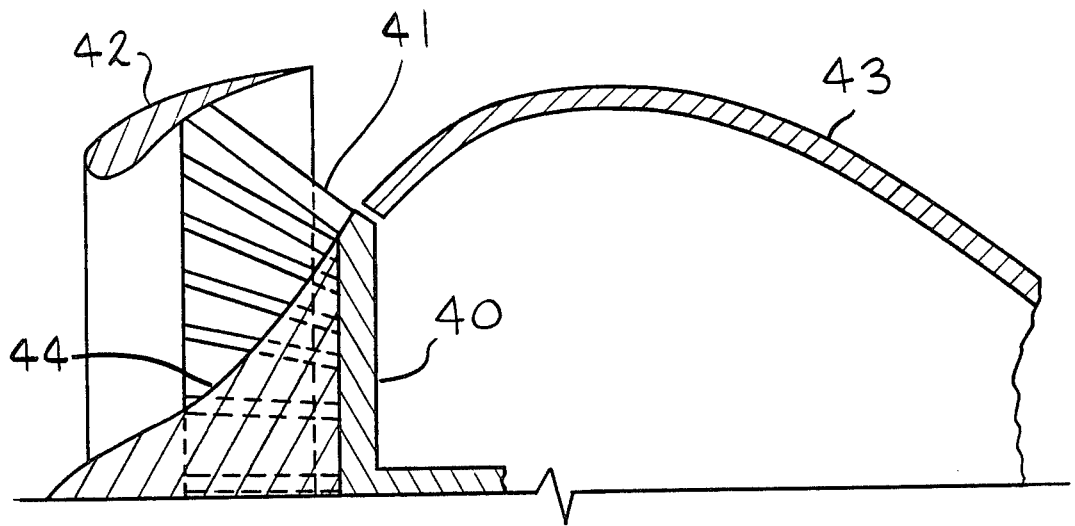
FIG. 7 is a cross-sectional side elevation view of a portion of another embodiment of the invention in which the blades extend somewhat at an angle outward from the horizontal.

FIG. 7 shows another embodiment of the invention in which blades 41 are inclined upwardly into the oncoming air from a hub 40 toward a radial direction rather than being horizontally oriented as shown in the embodiment of FIGS. 2, 3 and 4. An inlet ring 42 which in cross-section is aerodynamically shaped in combination with a complementarily shaped forward projecting circular air guide 44 forms an annular air flow passage or duct 45 to convey the flowing air to the region under the blades 41. The air in this region thereupon flows through the blades and over a stationary fairing shell 43, which is made to be a smooth curvalinear extension of the air flow guide 44. The fairing shell 43 is shaped to reduce potentials for turbulence in the blade exit region and resistance to flow over the unit. The profile of the air inlet ring 42 and its position are designed to cause the air flow thereover to assist the air emitted from the blade region to follow the fairing 43 to thereby promote still greater efficiency of operation of the turbine unit.

The blades 41 in being flared outward would ordinarily have a separation greater at their tips than at their base at the hub 44. The blades therefore can be graduated in width to their widest dimension at the tips where desired to maintain the slots constant in width. The slot area thus can be made to have less than the entry ring area in a manner similar to the first embodiment dependent upon prevailing conditions confronted. The blades may extend at an angle with a directional component predominantly parallel to the axis of rotation of the rotor and more specifically in a range up to about 45° to the axis of rotation.

FIG. 6 illustrates another arrangement for balancing the turbine unit 50 in which the counterweight 54 is provided on a hollow support beam 56 in which a generator (not shown) is contained in housing forming the counterweight 54. The generator is driven by a transmission shaft extending through the beam 56 directly from the rotor on the opposite side of the pivot column 60 which in turn extends upwardly from a bearing and electrical slip ring housing 61 on a mounting flange 62. The beam 56 extends through the air inlet ring 52 to provide access to the rotor shaft while its opposite counterweight housing is shaped aerodynamically to minimize turbulences in air flowing into the entry ring.

As will be apparent, a number of variations of the invention are possible within the scope of the principles described. Chord-wise dimensions of the wing-like blades and the airfoil profile may be varied along their length. Further, advanced the designs may incorporate known auxiliary high lift devices as used on aircraft, including turbine generated boundary layer control systems, i.e. suction or blowing type systems. For optimization of efficiency at given loads and fluid flow rates, it may be found economically feasible that the pitch angle be made automatically adjustable or featherable for the most output or made inoperable by full feathering in storms by rotation of the blades about their span-wise axis until the rotor rotation ceases at zero angle of attack. To further assist in obtaining an optimum power output from prevailing air flow conditions, directionally oriented stationary stator blades can also be provided on the inside of the rotor blade cage to direct the air flow most effectively through the blades.

Also, the duct 34 might be constructed to guide the operating fluid through only a selected number of blades, or only a section of the total number of blades rather than all the blades, or the aerodynamic fairing can be provided different forms and shapes and might incorporate guide vanes. Similarly the blade constriction region can be modified in that the blades can be skewed or pitched at different degrees. The blades might also be arranged to be angled or somewhat curved outwardly or inwardly as operating conditions dictate. Radial blades can also be provided within the peripheral blade cage to provide additional output which blades might also be curved to assist in directing entering air to the peripheral blades. The manner of support of the entry ring might also be modified such as by making the entry ring stationary. The aft fairing housing might also be made rotatable.

In view of the foregoing it will be understood that many variations of the disclosed invention can be made within the broad scope of the principles embodied therein. Thus while a particular preferred embodiment has been shown and described, it is intended by the appended claims to cover all such modifications which fall within the true spirit and scope of the invention.

I claim:

1. An air driven turbine comprising a rotor including a plurality of longitudinal blades distributed in spaced side-by-side relation about the axis of rotation of said rotor, each of said blades being aligned with its major dimensional component parallel to said axis, said blades being spaced in non-overlapping bounding relation about an interior of said rotor with the spaces between said blades forming air slot outlets from said interior, an air flow path for guiding flow of air into said interior and leading to said blades, an air inlet comprising an inlet ring forming an entrance to said air flow path, said blades across their width being shaped and angularly pitched to the flow of air therebetween to effect rotation of said rotor, said blades being spaced relative to each other such that each of said slot outlets is formed between the leading edge of each of said blades and the trailing edge of the preceding adjacent blade, the total cumulative area of said slot outlets being less than the minimum cross-sectional area long the air flow path of said inlet to said slots.

2. An air turbine as set forth in claim 1 wherein said air inlet comprises an inlet ring supported on one end of said blades and rotatable therewith.

3. An air turbine as set forth in claim 2 wherein said air inlet ring in cross-section is aerodynamically shaped with a curvalinear entry end and a trailing end which overhangs a portion of said blades.

4. An air turbine as set forth in claim 3 in which a circular air deflecting means is disposed at least in part within said blade bounded interior which is contoured to form an air flow path extending outwardly from said axis of rotation to said blades.

5. An air turbine as set forth in claim 4 wherein said air inlet ring is complementarily shaped with said air deflecting means to make said outward air flow path an annular path leading to said blades.

6. An air turbine as set forth in claim 5 wherein a circular secondary air baffle is located within the path of flow of air through said air inlet ring, said baffle being flared to promote distribution of air flowing thereby over the length of said blades.

7. An air turbine as set forth in claim 1 wherein an aerodynamically shaped aft fairing structure is provided in the trailing end of the air flow path through said blades and in which the fairing structure is circular in cross-section and concentric with the axis of said rotor, said fairing structure having a diameter slightly larger than the diameter of the trailing end of said inlet ring.

8. An air turbine as set forth in claim 1 which is wind driven and wherein a stationary baffle ring is associated in adjacent relation with said rotatable air inlet ring, said baffle ring in cross-section being aerodynamically shaped to direct external air flow in a direction across said blades to said aft fairing structure.

9. An air turbine driven for conversion of energy of flowing air to mechanical torque comprising a rotor having an axle on which said rotor rotates, a hub mounted on said axle, an assembly of adjacently spaced longitudinal blades each supported at one end on said hub in cantilever relation about an interior region and generally in a circumferential plane parallel to the axis of rotation of said rotor, an air entry ring mounted on the other end of said blades through which air flows into said region, air outlets in the form of an outlet between each adjacent pair of blades of said assembly, and means for guiding air flowing into said region for passage through at least a portion of the total number of outlets between the blades of said assembly, said blades across their width being shaped and pitched to effect rotation of said rotor upon passage of air through said outlets, said blades being spaced and oriented in non-overlapping relation to each other to form each of said outlets between the trailing edge of each of said blades and the leading edge of the succeeding adjacent blade, the total exit area of the outlets from said region being less than the total area of introduction of air through said air entry ring.

10. An air driven turbine as set forth in claim 9 in which said air entry ring in cross-section is shaped with a rounded entry and a trailing end which overhangs a portion of said blades.

11. An air driven turbine as set forth in claim 10 in which a fairing structure of diameter greater than the circumferential plane of said blades is positioned adjacent said blades for receipt of air emitted from said outlets.

12. An air driven turbine as set forth in claim 11 in which said fairing structure has a diameter greater than the trailing end of said entry ring.

13. A fluid flow energy converter comprising a rotor having a plurality of side-by-side longitudinal fluid engaging blades extending with their major dimensional component parallel to the axis of rotation of said rotor and in spaced non-overlapping relation about said axis, said rotor having an axial fluid flow inlet and fluid redirecting means for changing fluid flow in an axial direction to outward flow through space between said blades, said blades across their width being angularly pitched to the flow of fluid therebetween to effect rotation of said rotor, said inlet comprising an inlet ring which in crosssection is shaped with an outer diameter larger than the outer diameter of the circumferential region of said blades, the total area of spaces formed between the leading edge of each of said blades and the trailing edge of its next preceding blade being less than the total area of introduction of fluid through said inlet.

14. A fluid energy converter as set forth in claim 13 wherein said fluid redirecting means comprises a circular fluid flow deflector contoured to form an annular flow path outwardly from said axis of rotation to said blades.

15. A fluid energy converter as set forth in claim 13 wherein said rotor blades are each aerodynamically shaped for air flow energy conversion with a thick leading edge and a thin trailing edge.

16. A fluid energy converter as set forth in claim 13 wherein said rotor blades are each shaped for liquid flow energy conversion with a thin leading edge and a thick trailing edge.

17. A fluid flow energy converter comprising a rotor having an assembly of longitudinal fluid engaging blades spaced in non-overlapping relation about the axis of rotation of said rotor, said blades having their major dimensional component parallel to said axis of rotation whereby an internal space within said rotor is defined by said blades, an inlet to said internal space for entry of flowing fluid therein and slots between said blades providing outlets for flow of fluid from said internal space, means in said space defining a path of flow from said inlet outwardly to said blades and in cross flow relation between said blades, said blades being shaped and pitched about their length dimension an amount adequate to effectively rotate said rotor upon passage of fluid between said blades, said outlets being formed between the trailing edge of each of said blades and the leading edge of its succeeding adjacent blade, the total area of said slot outlets being less than the entry area of said inlet, and a fairing structure of diameter greater than the diameter of said assembly of blades and being positioned and shaped for receipt of fluid emitted from between said blades.

18. A fluid flow energy converter as set forth in claim 17 in which said rotor blades lie generally in a plane extending about said axis of rotation and parallel thereto a fixed distance from said axis.

* * * * *